Nov. 17, 1970  D. B. FONDA ET AL  3,540,824
EGG CANDLING APPARATUS AND METHOD FOR
DETERMINING THE FERTILITY OF EGGS

Filed Oct. 16, 1968  2 Sheets-Sheet 1

INVENTORS
DINO B. FONDA
HENRY M. CHANDLER
BY
ATTORNEY

United States Patent Office 3,540,824
Patented Nov. 17, 1970

3,540,824
EGG CANDLING APPARATUS AND METHOD FOR DETERMINING THE FERTILITY OF EGGS
Dino B. Fonda, Philadelphia, and Henry M. Chandler, Hatboro, Pa., assignors to Richardson-Merrell Inc., New York, N.Y., a corporation of Delaware
Filed Oct. 16, 1968, Ser. No. 767,945
Int. Cl. G01n 33/08
U.S. Cl. 356—53
6 Claims

ABSTRACT OF THE DISCLOSURE

Apparatus and method for candling eggs to determine life in an incubating chick embryo in which relatively intense white light is passed through the partially incubated egg and the resulting transmitted light at about 7300 angstroms is converted into electrical impulses from a photoelectric cell which are then amplified, passed through a low pass filter to eliminate frequencies other than 3 to 5 cycles per second, and then amplified to actuate means for accepting eggs containing live embryos or rejecting those in which the embryo is dead.

---

Figure 1:
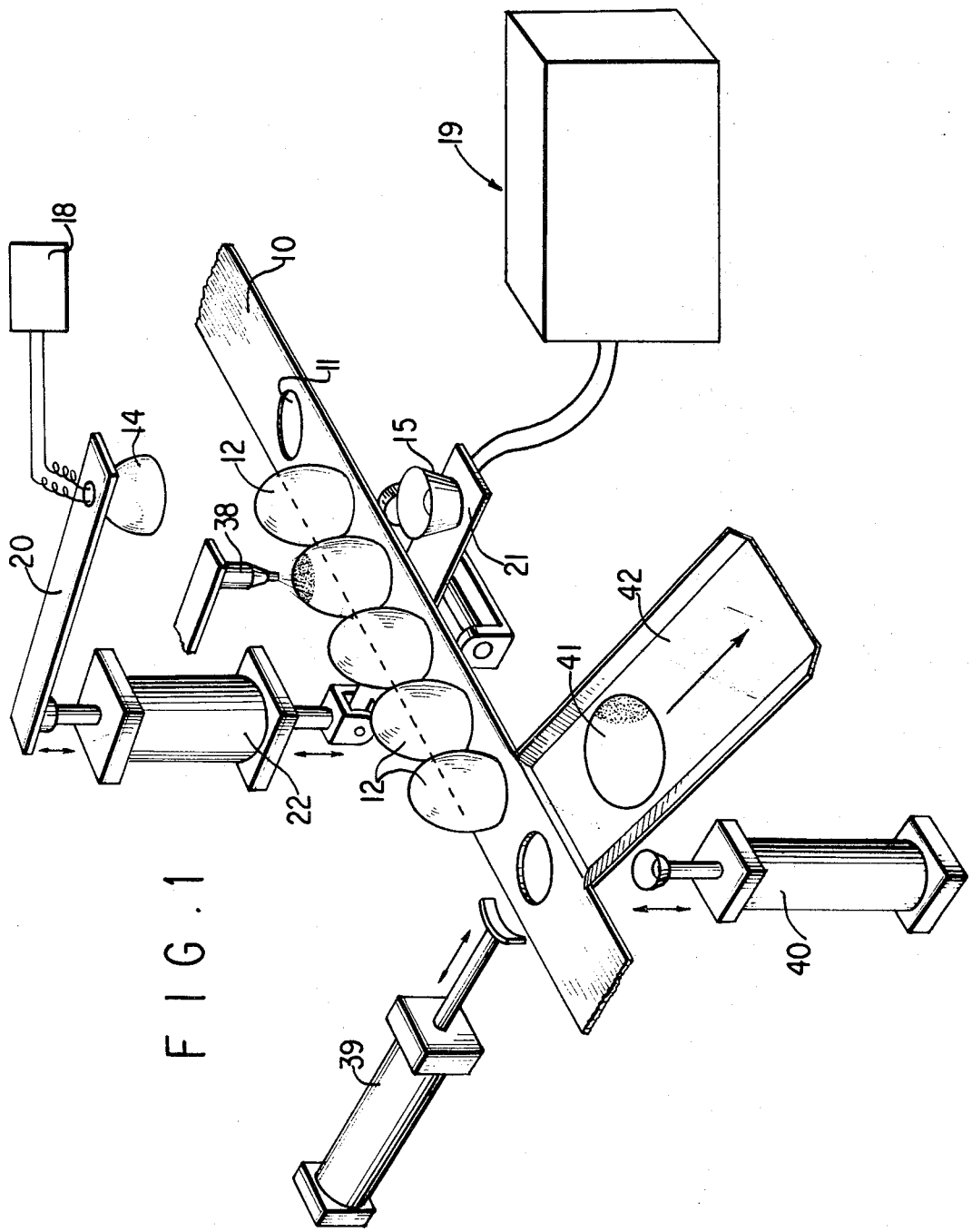

This invention relates to apparatus and to methods of using it for the determination of life in incubating chick embryos.

Vaccines effective against pathogenic viruses are often made by propagating the live virus in incubating chick embryos. In these processes, a live viral agent is inoculated into a selected part of a live chick embryo in an egg which has been incubated for four or five days and the egg is then returned to the incubator for further incubation. It is customary when preparing virus vaccines from incubating chick embryos to withdraw the chorioallantoic fluid or other selected parts of the incubating egg which contains virus-rich material and prepare the vaccine from this tissue. This is done after the egg has incubated for a period of two to twelve days after the initial inoculation with the live virus. Viruses are able to propagate only in the presence of live tissue, and consequently, if the embryo is dead or dies after inoculation with the virus, the virus will also cease to propagate. If the virus has died subsequent to inoculation of the egg, the withdrawn fluid may be either devoid of live virus particles or it may be found that the embryo has been infected with a bacterial agent which is able to multiply in the dead tissue of the egg. Accordingly, the harvested fluid may contain a low titre of antigens and possibly harmful quantities of bacteria which are, of course, undesirable in the viral vaccine.

In order to be sure that the harvested tissue from the incubated eggs contains a maximum of viral particles and a minimum of bacteria, it is common practice to candle the egg prior to inoculation with a live virus and also several times thereafter including just before the final harvest of the embryonic tissue to be sure that the embryo is alive. Inasmuch as millions of eggs are used annually in the preparation of viral vaccines, the task of examining each egg individually to be sure that it contains a live embryo is a time-consuming and expensive operation. The present invention provides apparatus which will examine the incubating eggs automatically and indicate or reject those eggs which do not have a live embryo at the time of the examination.

Essentially, the present invention comprises for the examination of the incubating embryo illuminating means, photoelectric means and appropriate filters, and amplifiers and rejection mechanisms. Photoelectric methods of detecting heartbeat by light transmission through animal tissue is in itself not new. However, the apparatus and methods previously devised for detecting heartbeat in humans, for example, by photoelectric methods, is not suitable for detecting the heartbeat of a chick embryo in an incubating egg.

The incubating egg with live embryo does not present a uniform body of tissue through which light may pass. The incubating egg has, first of all, a translucent shell through which light must pass. The egg also has an air sac at one end which, as its name implies, contains air. The embryo may be small and located in a small portion of the space within the egg. The yoke and the chorioallantoic fluid are practically devoid of arteries and veins through which blood passes. As a matter of fact, it appears that the only useful tissue within the incubating egg which could supply a color change due to passage of blood is in a relatively thin membrane which surrounds the yolk sac and through which blood is passed from the heat of the embryo around the inner periphery of the egg shell and thence back to the embryo. This vascular structure, which is known as the extra embryonic circulation loop, contains vitelline arteries and veins. The arteries are under pressure from the heartbeat and are heavily reinforced by elastic tissue and smooth muscle whereas the veins which carry the blood towards the heart of the embryo are under relatively low and constant pressure and their connective tissue is predominantly of the non-elastic type. As will be seen, only the arteries of the extra embryonic circulation loop provide means for detecting changes in blood flow photoelectrically, and these are by no means uniformly distributed throughout the incubating egg structure. I have discovered, however, that by means of the apparatus to be described and claimed herein which employs electronic means of carefully selected design, the heartbeat of the chick embryo can be determined accurately, reliably, and essentially automatically, thus providing indices by which the incubating egg may be passed as being viable or rejected as being dead.

Figure 2:
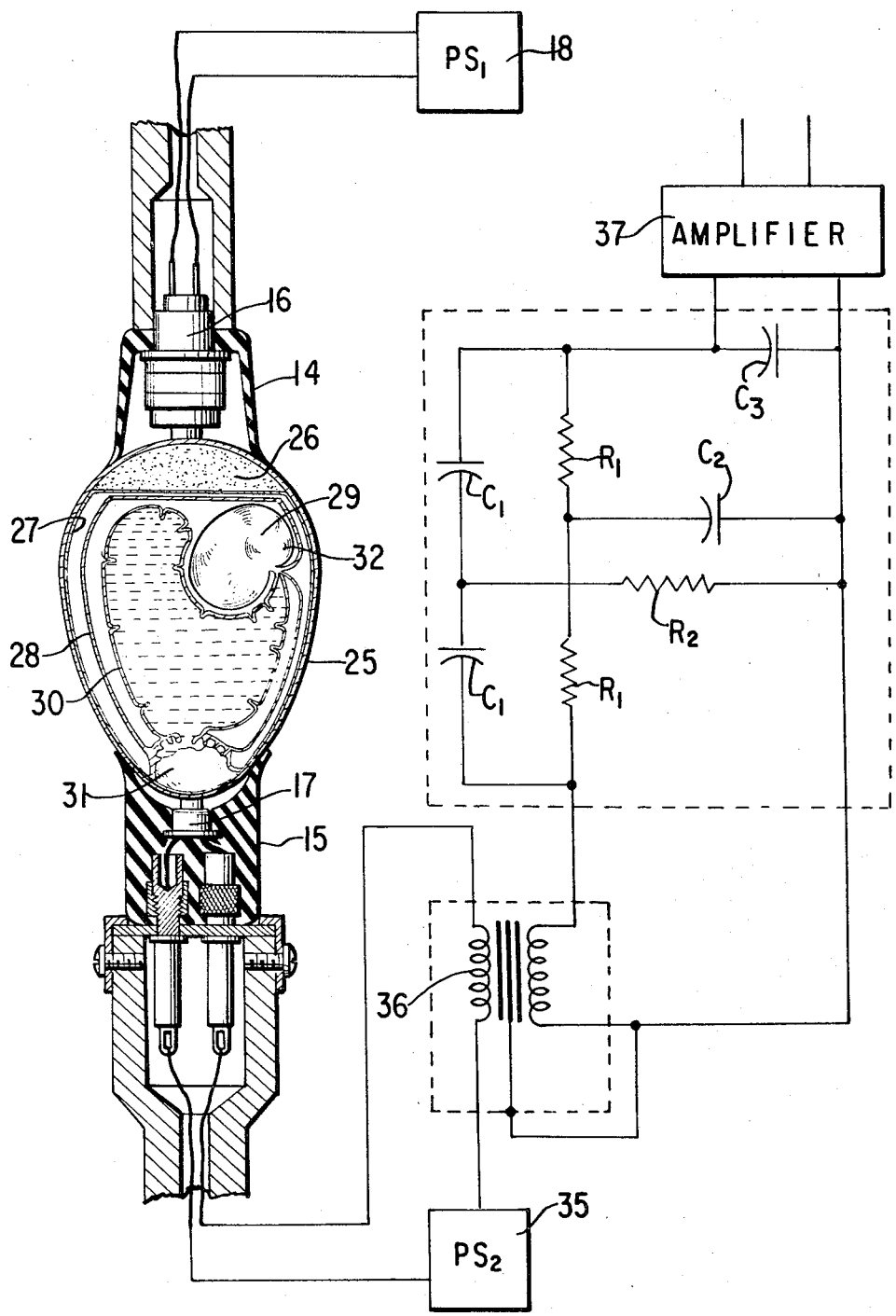

In order that the invention may be more clearly understood, reference may be made to the accompanying drawing in which:

FIG. 1 is an isometric projection of a skeletonized part of the apparatus of the present invention; and FIG. 2 is a cross-sectional view in elevation of the scanning part of the apparatus with necessary electronic components for operation of the instrument shown as an electric circuit.

Referring again to FIG. 1, the apparatus of the present invention in simplified form may embody a carrier member 10 with apertures 11 designed to hold eggs 12 in an upright position. It will be understood, of course, that in the adaptation of the apparatus of the present invention to commercial operation, the conveyor belt 10 may carry a dozen or more eggs abreast as they pass by an equal number of individual scanning units.

The scanning unit may comprise a pair of cups 14 and 15 carrying a light source 16 and a photoelectric cell 17 as shown in FIG. 2. The light source is connected to a suitable source of power 18 and the photoelectric cell is suitably connected to electrical components of the filter and amplifier generally indicated at 19. The cups 14 and 15 shielding the source of light and the photoelectric cell, respectively, are mounted in any suitable manner 20 and 21 and oriented so as to cover both ends of the axis of the egg as shown in FIG. 2. These cups may be actuated through a solenoid 22 which acts in association with the movement of the conveyor member 10 so that when an egg 12 is in a position to be scanned, action of the solenoid 22 will press cups 14 and 15 firmly against the axial ends of the incubating egg.

As shown in FIG. 2, the cups 14 and 15 should be of a soft, opaque, rubber-like material so as to press against the egg firmly without breaking the fragile shell and close off those areas of the egg shell from ambient light. When the cups are in position with respect to the egg as shown in FIG. 2, light from the lamp 16 will pass into the embryonating egg and those portions of it which filter through will be received by the photoelectric cell 17.

The light source 16 may suitably be a high intensity light of one-half or higher candle power emitting light having a wave range which includes at least 6500 to 8500 angstrom units.

As will be seen from FIG. 2, the incubated egg consists essentially of a shell 25 within which is air sac 26 and shell membrane 27. The chorioallantoic membrane 28 carries a large proportion of the arteries through which blood is pumped from the embryo 29. Other parts of the incubated egg include the yolk sac 30, albumen 31, and ammion 32. Obviously, the transmitted light passes through many different types of tissue before reaching the photoelectric cell 17.

The photoelectric cell should have a light-to-dark resistance ratio of at least about 1:5000 minimum from two foot candles within 5 seconds. The peak spectral response should occur at approximately 7350 angstrom units. The resistance at one foot candle can be about 2000 to 120,000 ohms. A number of photoelectric cells which meet these requirements are available and include Clairex cadmium selenide cell type numbers CL 603 AL, CL 703 L, CL 503, CL 5M3, and CL 903 L. Obviously, photoelectric cells of other manufacturers and of other types which meet the requirements noted above may be used with suitable circuitry.

Candling of the egg to detect heartbeat and hence life may start within four or five days after commencement of incubation or as soon as a vascular system develops and starts functioning. The heartbeat may vary from about 3 to 5 beats per second. Candling can continue until about the seventeenth or eighteenth day when the chick embryo becomes profusely covered with feathers. The pulsating current of 3 to 5 cycles per second coming from the photoelectric cell is amplified and voltage fluctuations resulting from extraneous sources are filtered out. The most bothersome frequency is that of 60 cycles per second due to ambient light from electric lamps in the room. Impulses from the photoelectric cell and other sources also occur and should be filtered out insofar as possible.

The circuit illustrated in FIG. 2 includes a source of power 35 which is preferably a well regulated 45 volt direct current power supply. Transformer 36 may be one having a low primary winding impedance of 100 ohms to 10,000 ohms, preferably 6000 to 7000 ohms, at 20 to 500 cycles per second. The transformer used in early designs had a primary to secondary turn ratio of 1 to 16.4 and a primary inductance of 17.5 henrys. The frequency response should be as low as possible, preferably down to 3 cycles per second. However, transformers having a frequency response as low as 30 have been used with good results. It should have both magnetic and electrostatic shielding. A suitable transformer is the commercial Microtran No. M 8025 using only one half of the primary.

The filter circuit is connected as a "parallel T" network with a shunt capacitor output. The component values should be selected so that the filter resonates at 60 cycles, thereby providing excellent attenuation of unwanted, fundamental, 60 cycle noise and associated harmonics. Since this type of filter exhibits sharp "cut-off" characteristics at the designed resonate frequency, the heartbeat frequency range of 3 to 5 cycles per second suffers little attenuation.

The value of the components shown in FIG. 2 which have been found to be satisfactory are $C_1=.22$ m.f.d., $C_2=.47$ m.f.d., $R_1=12,000$ ohms, $R_2=57000$ ohms, and $C_3=.33$ m.f.d.

The amplifier 37 may be of any suitable type to amplify the output of the filter circuit for the desired purpose of controlling the identification and rejection of dead embryos.

To illustrate how the apparatus of the present invention operates, the following description is offered. Incubating eggs whose viability is to be determined are placed on a conveyor belt 10 as shown in FIG. 1. The light source and photoelectric cell units 14 and 15, respectively, are then moved into position over the ends of the egg as shown in FIG. 2. The light 16 may be turned on automatically by suitable switches, and some of it passes through the embryonating egg. Weak pulses of light at approximately 7350 angstrom units pass out through the lower end of the egg to the photoelectric cell. As will be noted, it is not necessary to open or otherwise penetrate the shell of the egg. If the embryo is alive, a weak electrical current will be transmitted through the photoelectric cell at 3 to 5 cycles per second. This weak current is amplified to some small extent by the transformer 36, passes through the filter circuit, and is amplified further. If an amplified current is forthcoming from the amplifier, the embryo is considered to be alive, and the cups 14 and 15 will be lifted and the conveyor moved forward to the next position. This operation continues as long as a heartbeat is detected in the egg through which the light is flowing.

If, on the other hand, no current is detected because of the lack of heartbeat in the embryo, a relay mechanism can perform any one of several functions to indicate that the embryo is dead. One of these functions is to spray a colored dye on the dead egg as indicated by spray nozzle 38 in FIG. 1. This so-marked egg can be removed from the conveyor by hand at a later time. Alternatively, lack of amplified signal may cause an ejection mechanism, 39 or 40, to push the dead egg 41 out of its pocket in the conveyor belt and down a chute 42 to waste disposal.

It was observed during development of the apparatus of the present invention that when ten day old embryos were handled, the embryo quite often became physically active, thrashing about in wild abandon, and this resulted in further modulation of the visible light. However, the wave form of these motions were generally much slower than the heartbeat of the embryo. Moreover, the modulations due to the heartbeat are superimposed on the transient modulation due to motion of the embryo. The physical motions of the live embryo do not effect operation of the apparatus.

It will be understood, of course, that the apparatus of the present invention may be used in determining the presence of live embryos in the eggs of ducks and other fowl as well as in the eggs of certain reptiles. Also, the apparatus may find considerable utility in candling eggs in commercial hatcheries.

What is claimed is:

1. Apparatus for detecting the heartbeat of an incubating avian embryo in an egg which comprises means for holding an egg to be examined in a fixed position, means for passing light of a frequency between 6500 and 8500 angstrom units through the shell of said egg and into the embryonic structure within, means for converting light pulsations of 7300 to 7500 angstroms wavelength which emerge from the shell of the egg on the opposite side to electrical impulses, means for amplifying said electrical impulses between 3 and 5 cycles per second, means for filtering impulses of more than 30 cycles per second from said amplified current, and means for amplifying said filter-passed 3 to 5 cycle current.

2. Apparatus for detecting the heatbeat of an incubating avian embryo in an egg which comprises means for holding an egg to be examined, means including a source of light of a frequency between 6500 and 8500 angstrom units and a resilient shielding member adapted to press against one end of the egg along its longitudinal axis and direct said light through the shell of said egg while excluding extraneous ambient light, a second resilient member holding a photoelectric cell and adapted to receive light from said light source which passes through the shell of said egg from the opposite axis thereof while preventing extraneous ambient light from contacting said photoelectric cell, a source of direct current passing through said photoelectric cell and being modulated by the light pulses impinging on said photoelectric cell, means for amplifying said modulated electrical impulses between 3 and 5 cycles per second, means for filtering impulses of more than 30 cycles per second from said amplified current, means for further amplifying said filter-passed 3 to 5 cycle current, and means for indicating absence of a heartbeat in said embryo by absence of an amplified current as light is passed through said egg.

3. Apparatus in accordance with claim 2 in which the photoelectric cell has a light-to-dark resistance ratio of at least about 1:5000 from two foot candles within 5 seconds and a peak spectral response of approximately 7350 angstrom units and a resistance at one foot candle of 2000 to 100,000 ohms.

4. Apparatus in accordance with claim 2 in which the amplifying means receiving pulsating current from the photoelectric cell is a transformer having a low primary impedance of 100 to 10,000 ohms at 20 to 50 cycles per second and has a frequency response as low as at least 30 cycles per second, preferably as low as 3 cycles per second.

5. A method of candling partially incubated eggs to determine embryonic life therein which comprises passing light of at least one-half candle power and of a frequency between 6500 to 8500 angstrom units through the shell of the egg and receiving the transmitted light which passes through the embryonic structure on the opposite side of said egg shell on a photoelectric cell having a light-to-dark resistance ratio of at least about 1:5000 from two foot candles within 5 seconds and a peak spectral response of approximately 7350 angstrom units and resistance at one foot candle of 2000 to 100,000 ohms, amplifying the modulated current from said photoelectric cell, passing the amplified current through a filter circuit to eliminate modulations of a frequency greater than 30 cycles per second but passing pulsating current of 3 to 5 cycles per second, amplifying said band passed current and observing the amplified current as an indication of life in the chick embryo.

6. A method in accordance with claim 5 in which the light is passed through the longitudinal axis of the egg.

References Cited

UNITED STATES PATENTS 2,310,682    2/1943    Dooley.

RONALD L. WIBERT, Primary Examiner

O. B. CHEW II, Assistant Examiner

U.S. Cl. X.R.

209—111.7; 250—221